UNITED STATES PATENT OFFICE.

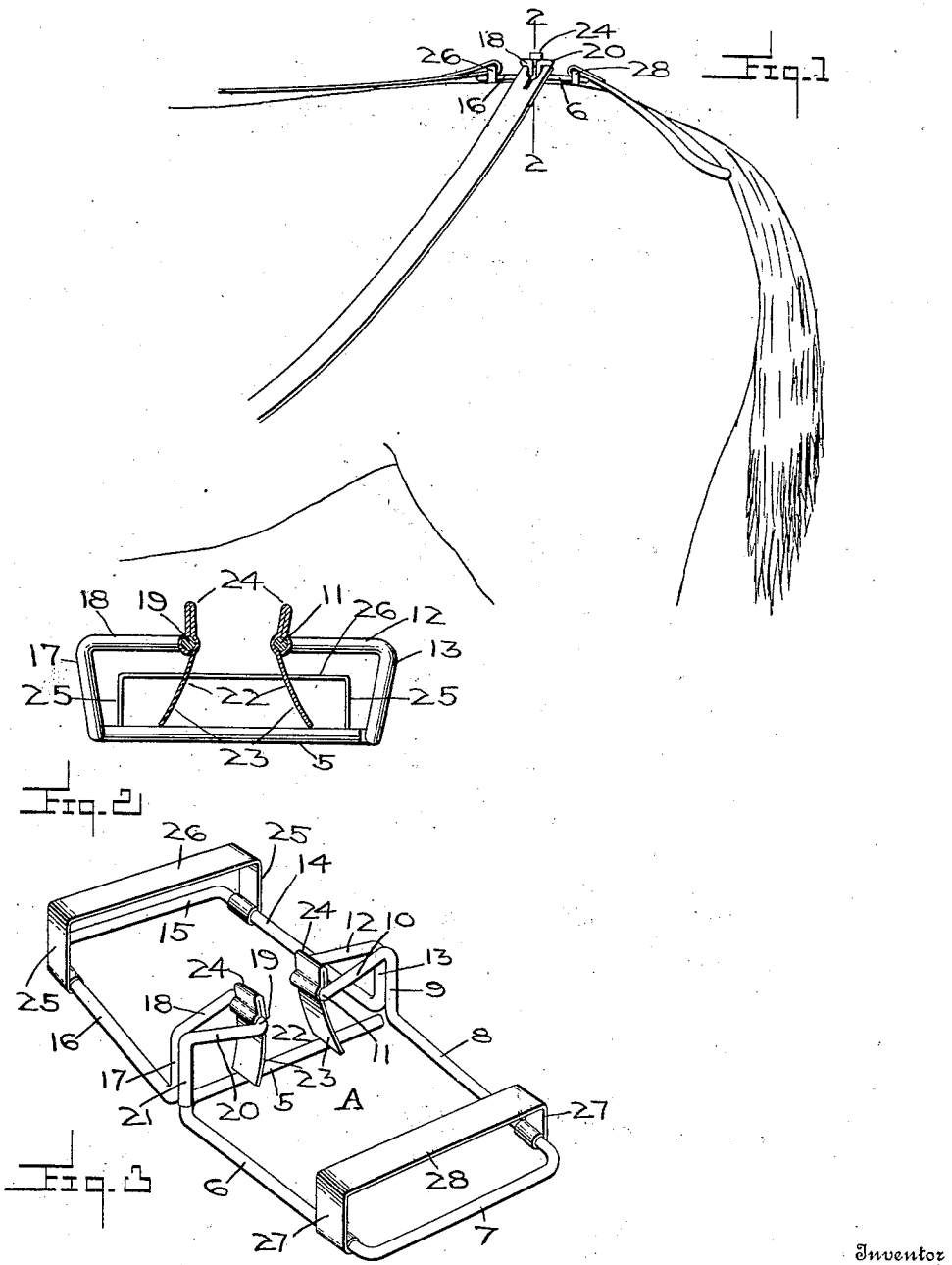

DANIEL S. LEPLEY, OF AURORA, KANSAS.

HARNESS APPLIANCE.

No. 923,434.　　　Specification of Letters Patent.　　　Patented June 1, 1909.

Application filed April 15, 1908. Serial No. 427,203.

*To all whom it may concern:*

Be it known that I, DANIEL S. LEPLEY, a citizen of the United States, residing at Aurora, in the county of Cloud and State of Kansas, have invented certain new and useful Improvements in Harness Appliances, of which the following is a specification.

This invention relates to the class of harness, and more particularly to means for holding the traces above the ground when it is desired to remove the animal from the vehicle, and has for an object to provide a device of this character which will be effective for the purpose intended, simple, and which may be manufactured at a relatively low figure.

Other objects and advantages will be apparent from the following description and it will be understood that changes in the specific structure shown and described may be made within the scope of the claims without departing from the spirit of the invention.

In the drawings forming a portion of this specification, and in which like characters of reference indicate similar parts in the several views, Figure 1 is a side elevational view of the present invention showing the application of the same to a horse, Fig. 2 is a sectional view on the line 2—2 of Fig. 1, Fig. 3 is a perspective view of the device detached.

Referring now more particularly to the drawings, there is shown a harness appliance comprising a frame A which is preferably formed of a single length of wire, as shown. The wire forming the frame is bent to provide a central transversely extending portion 5 which is bent at one end to provide an outwardly directed member 6, from which there extends a transverse end member 7 lying in parallel relation with the member 5, as shown. Beyond the member 7, the wire is bent inwardly to form a base member 8 similar to the one 6 and provided with a vertical support 9 having an inwardly directed arm 10 and a longitudinally disposed pivot shaft 11. A support 12 extends inwardly from the pivot 11 in spaced relation with the portion 10 just described and carries at its outer end a vertical support 13 adjacent to and parallel with the one 9, as shown. From the portion 13, the wire forming the frame is continued to form a base member 14 similar to the members 6 and 8 respectively, and a transverse end member 15 similar to the end member 7. From this portion there extends inwardly another base member 16, and adjacent the transversely extending member 5, it is bent to provide a vertical support 17, inwardly directed arm 18, a longitudinal pivot shaft 19 opposite to and in spaced relation with the pivot 11; and a portion 20, bent at its outer end to provide a depending portion 21 arranged in parallel relation to the portion 17, as shown. It will thus be seen that the longitudinally disposed portions 11 and 19 respectively are located directly above and in spaced relation to the transversely extending member 5. The portions 11 and 12 each support a pivoted dog 22 provided with an angularly disposed depending portion 23 yieldably engaged at its lower end with the transversely extending member 5. Each dog is provided with an angularly disposed manipulating lip 24.

The members 14 and 16 adjacent the end member 15 support depending portions 25 of a transversely extending bar 26. The members 6 and 8 respectively adjacent the end member 7 carry similar depending portions 27 of a transversely extending plate 28.

It will thus be seen, that when the device is in use, the crupper strap may be engaged with the plate 28, and the hip strap may be engaged with the plate 26. It will be apparent that the trace tugs may be conveniently engaged beneath the members 18 and 20, and 10 and 12 respectively to prevent dragging of the traces upon the ground. The construction of dogs as described, is such that the traces are held from accidental displacement as will be readily understood. When it is desired to release the traces the portions 24 of the dogs may be moved in an outward direction to elevate the portions 23, and the traces conveniently disengaged. The transversely extending member 5 is yieldingly engaged with the portions 23 of the dogs, and effectively serves to hold these dogs in their operative positions.

What is claimed is:

1. A device of the class described comprising a frame formed integrally from one portion of metal, said frame comprising spaced sides and end members, one of said side members having an inwardly projecting extension forming a resilient transverse arm centrally of the frame, each of said side portions having integral oppositely disposed vertical supports, said supports carrying spaced inwardly extending arms, carrying at their inner ends spaced parallel pivot portions, dogs carried by said pivot portions, said dogs having opposite arms, one of said arms being disposed yieldably against said transverse arm, the other of said arms being bent upwardly to form a finger engaging portion, and harness engaging members carried at opposite ends of the frame, said harness engaging members comprising laterally disposed bar portions having spaced pendent support portions engaged with the side members of the frame.

2. In a harness connection of the class described, a base frame formed integrally of one piece of wire, said frame having a resilient laterally extending arm, and integral oppositely disposed trace supporting members having a laterally extending pivot portion at their outer ends, dogs pivoted on said pivot portion, said dogs having retaining arms disposed yieldably against said resilient arm, said dogs having also outwardly projecting finger engaging portions and being adapted to secure the trace yieldably upon said trace engaging portion.

3. The combination with a supporting frame carrying oppositely disposed trace engaging hooks and having a laterally extending resilient arm disposed beneath said hooks, said frame, hooks and arm being formed integrally of one portion of wire, of dogs pivoted at the ends of said trace engaging portions and having pendent arms yieldably engaged against said transverse member for yieldable retention of a trace upon said trace engaging members, said dogs having also an operating portion extending outwardly thereof.

In testimony whereof I affix my signature, in presence of two witnesses.

DANIEL S. LEPLEY.

Witnesses:
 C. W. ACKLEY,
 R. H. PHELPS.